United States Patent
Manta et al.

(10) Patent No.: US 10,641,189 B2
(45) Date of Patent: May 5, 2020

(54) TURBOCHARGER PROTECTION SYSTEMS AND METHODS

(71) Applicant: GM GLOBAL TECHNOLOGY OPERATIONS LLC, Detroit, MI (US)

(72) Inventors: Eugenio Manta, Valdellatorre (IT); Mirco De Marco, Grugliasco (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 89 days.

(21) Appl. No.: 15/969,866

(22) Filed: May 3, 2018

(65) Prior Publication Data

US 2019/0338715 A1 Nov. 7, 2019

(51) Int. Cl.
| | |
|---|---|
| *F02D 41/00* | (2006.01) |
| *F02D 41/06* | (2006.01) |
| *F02D 41/22* | (2006.01) |
| *F04D 27/02* | (2006.01) |
| *F02B 37/12* | (2006.01) |

(52) U.S. Cl.
CPC ....... *F02D 41/0007* (2013.01); *F02D 41/064* (2013.01); *F02D 41/22* (2013.01); *F04D 27/0261* (2013.01); *F02B 2037/122* (2013.01); *F02B 2037/125* (2013.01)

(58) Field of Classification Search
CPC .... F02D 41/0007; F02D 41/064; F02D 41/22; F02B 2037/122; F02B 2037/125; F04D 15/0066; F04D 27/0261
See application file for complete search history.

(56) References Cited

U.S. PATENT DOCUMENTS

| | | | | |
|---|---|---|---|---|
| 7,912,620 | B2 * | 3/2011 | French | F01M 1/16 123/196 S |
| 2014/0214304 | A1 * | 7/2014 | Mischler | F02D 41/18 701/102 |
| 2014/0318508 | A1 * | 10/2014 | Banker | F02M 31/042 123/556 |
| 2015/0134156 | A1 * | 5/2015 | Henry | B61C 17/12 701/19 |
| 2017/0370280 | A1 * | 12/2017 | Lock | F02B 37/004 |
| 2019/0186397 | A1 * | 6/2019 | Gupta | F02D 41/064 |

* cited by examiner

*Primary Examiner* — Audrey K Bradley

(57) ABSTRACT

Methods for protecting turbochargers of engine systems include determining a speed gradient of the turbocharger and implementing a turbocharger speed protection action if the determined speed gradient is above a speed gradient threshold. Implementing a protection action comprises limiting engine torque, engine speed, vehicle speed, and/or fuel injection to the engine. The method can further include determining a cold start condition prior to determining the speed gradient of the turbocharger. A cold start condition can be determined based on ambient temperature, engine oil temperature, or engine coolant temperature. The method can further include, subsequent to implementing the turbocharger speed protection action, disabling the turbocharger speed protection action when a subsequently determined turbocharger speed gradient is below the speed gradient threshold. Systems for implementing the methods are also disclosed.

20 Claims, 3 Drawing Sheets

TURBOCHARGER PROTECTION SYSTEMS AND METHODS

INTRODUCTION

During a combustion cycle of an internal combustion engine, air/fuel mixtures are provided to cylinders of the engine. The air/fuel mixtures are compressed and/or ignited and combusted to provide output torque. Many diesel and gasoline engines employ a supercharging device, such as an exhaust gas turbine driven turbocharger, to compress the airflow before it enters the intake manifold of the engine in order to increase power and efficiency. Specifically, a turbocharger is a centrifugal gas compressor that forces more air (i.e., oxygen) into the combustion chambers of the engine than is otherwise achievable with ambient atmospheric pressure. The additional mass of oxygen-containing air that is forced into the engine improves the engine's volumetric efficiency, allowing it to burn more fuel in a given cycle, and thereby produce more power. Turbocharger components must be lubricated to prevent damage and undesired component wear.

SUMMARY

Provided are methods for protecting a turbocharger of an engine system. The turbocharger can include a turbine configured to receive exhaust gas from the engine and a compressor configured to communicate compressed air to the engine. The methods can include determining a speed gradient of the turbocharger, and implementing a turbocharger speed protection action if the determined speed gradient is above a speed gradient threshold. Implementing a turbocharger speed protection action can include limiting engine torque. Implementing a turbocharger speed protection action can include limiting engine speed. Implementing a turbocharger speed protection action can include limiting vehicle speed. Implementing a turbocharger speed protection action can include limiting fuel injection to the engine. The method can further include determining a cold start condition of the engine prior to determining the speed gradient of the turbocharger. Determining a cold start condition of the engine can include determining an ambient temperature below an ambient temperature threshold. Determining a cold start condition of the engine can include determining an engine oil temperature below an engine oil temperature threshold and/or determining an engine coolant temperature below an engine coolant temperature threshold prior to determining the speed gradient of the turbocharger. The speed gradient threshold can be selected from a lookup table indexed by one or more of ambient temperature and engine run time, fuel temperature, engine oil temperature, engine coolant temperature, and integrated engine torque measured from engine startup. The method can further include, subsequent to implementing the turbocharger speed protection action, disabling the turbocharger speed protection action when a subsequently determined turbocharger speed gradient is below the speed gradient threshold.

Further included are turbocharger protection systems. The systems can include a turbocharger having a turbine configured to receive exhaust gas from an engine and a compressor configured to communicate compressed air to the engine, and a controller. The controller can be configured to determine a speed gradient of the turbocharger, and implement a turbocharger speed protection action if the determined speed gradient is above a speed gradient threshold. Implementing a turbocharger speed protection action can include limiting engine torque. Implementing a turbocharger speed protection action can include limiting engine speed. Implementing a turbocharger speed protection action can include limiting vehicle speed. Implementing a turbocharger speed protection action can include limiting fuel injection to the engine. The controller can be further configured to determine a cold start condition of the engine, and implement a turbocharger speed protection action if the determined speed gradient is above a speed gradient threshold and a cold start condition is determined. The controller can be configured to determine a cold start condition of the engine if an ambient temperature is below an ambient temperature threshold. The controller can be configured to determine a cold start condition of the engine if an engine oil temperature is below an engine oil temperature threshold. The controller can be configured to select the speed gradient threshold from a lookup table indexed by one or more of ambient temperature and engine run time, fuel temperature, engine oil temperature, engine coolant temperature, and integrated engine torque measured from engine startup. The controller can be configured to disable the turbocharger speed protection action if, subsequent to implementing turbocharger speed protection action, a subsequently determined turbocharger speed gradient is below the speed gradient threshold.

The details of one or more examples are set forth in the accompanying drawings and the description below. Other features, objects, and advantages will be apparent from the description and drawings, and from the claims.

DETAILED DESCRIPTION

Figure 1:
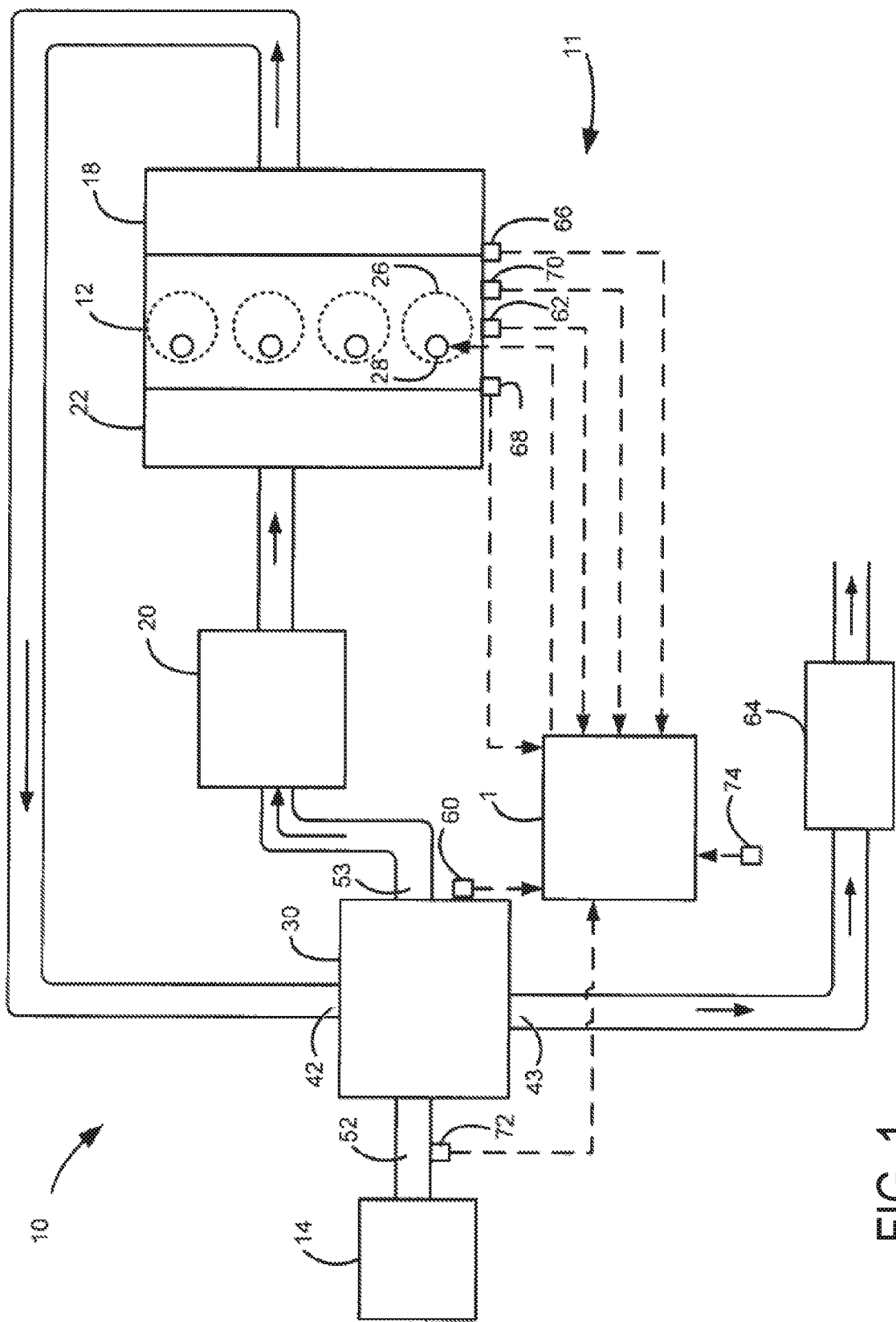
FIG. 1 illustrates a schematic of a vehicle, according to one or more embodiments of the disclosure.

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As used herein, the term "controller" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

FIG. 1 illustrates a schematic of a vehicle 10 including an engine system is schematically illustrated in accordance with the present disclosure. It is appreciated that the engine system is merely exemplary in nature and that the turbocharger protection system described herein can be implemented in various engine systems. A turbocharged engine system 11 includes an engine 12 that combusts an air and fuel mixture to produce drive torque. Air is delivered to an intake manifold 22 and is distributed into cylinders 26. Although four cylinders 26 are illustrated, it is appreciated that the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a v-type cylinder configuration. Fuel is injected into the cylinders 26 by fuel injectors 28. Combustion of the air/fuel mixture reciprocates pistons (not shown) within each cylinder 26 and creates exhaust. Exhaust exits the cylinders 26 into an exhaust system. The exhaust system can include one or more exhaust gas treatment devices 64.

The controller 1 regulates operation of the engine 12 based on various engine operating parameters, for example such as operating parameters received as signals from one or more sensors appurtenant to the vehicle 10. For example, system 11 can include a turbocharger speed sensor 60 configured to generate a turbocharger speed signal and transmit the signal to the controller 1. The controller can use a plurality of turbocharger speed signals to determine a turbocharger speed gradient, as will be discussed below. System 11 can include a vehicle speed sensor 74 configured to generate a vehicle speed signal and transmit the signal to the controller 1. System 11 can include an engine coolant temperature sensor 68 configured to generate a coolant temperature signal and transmit the signal to the controller 1. System 11 can include an engine oil temperature sensor 70 configured to generate an engine oil temperature signal and transmit the signal to the controller 1. System 11 can include an ambient temperature sensor 72 configured to generate an ambient temperature signal and transmit the signal to the controller 1. Ambient temperature sensor 72 can be disposed proximate to or in the compressor intake 52 or the air filter 14, for example. System 11 can include an engine speed sensor 62 configured to generate an engine speed signal based on the rotational speed of the engine 12 (e.g., the rotational speed of a crankshaft appurtenant to engine 12) and transmit the signal to the controller 1. System 11 can include a fuel temperature sensor 66 configured to generate a fuel temperature signal and transmit the signal to the controller 1.

The controller 1 can regulate operation of the engine 12 for example by generating fuel requests based on or more factors and control the fuel injectors 28 based on said one or more factors. In some embodiments, the controller 1 can generate a fuel request based on an accelerator pedal position, or controller 1 logic configured to achieve various vehicle objectives (e.g., idle, lean burn strategies, etc.) For example, in certain vehicle operating conditions (e.g., idle), controller 24 may generate fuel requests to achieve a desired engine speed.

Figure 2:
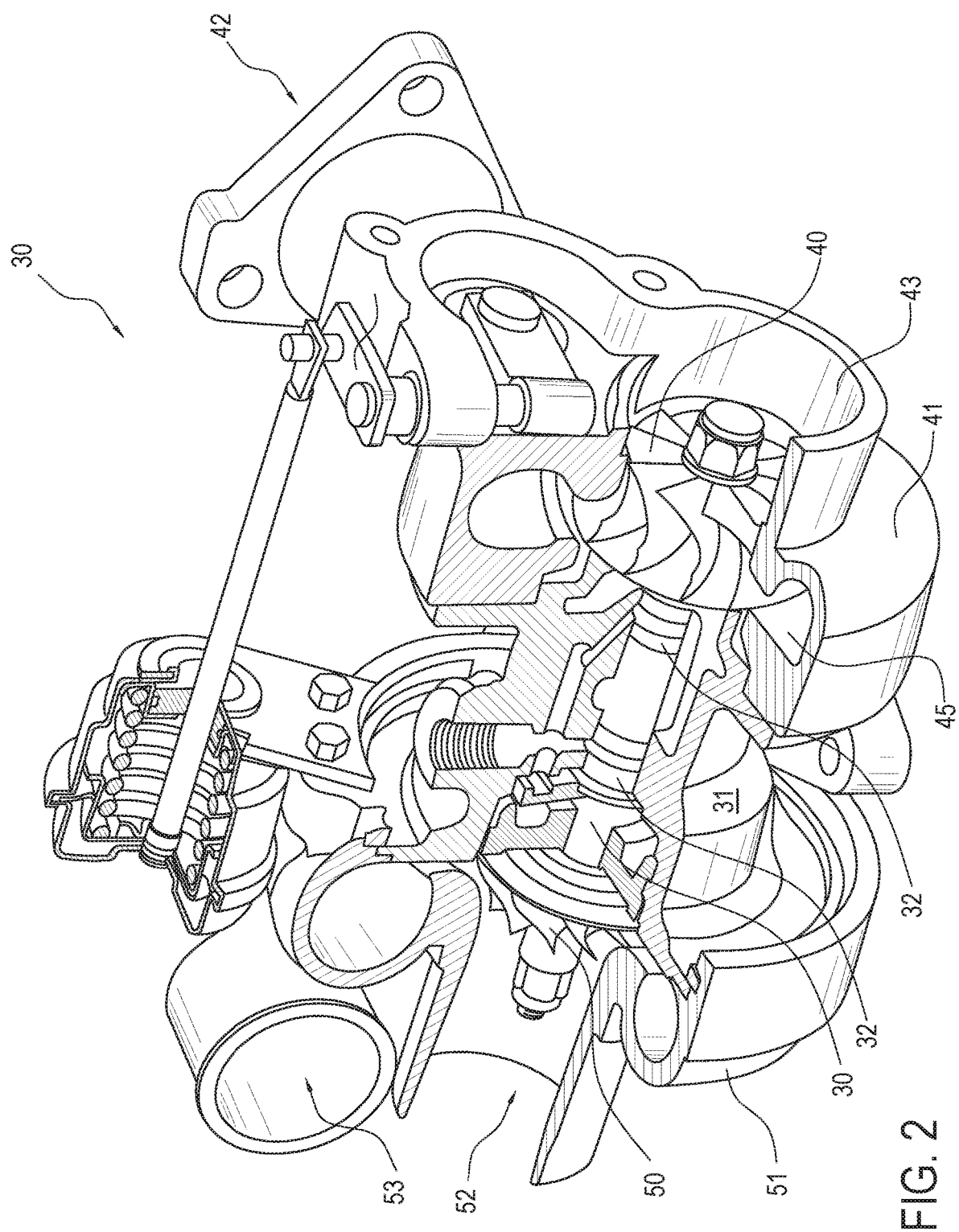
FIG. 2 illustrates a perspective cutaway view of turbocharger, according to one or more embodiments of the disclosure.

FIG. 2 illustrates a perspective cutaway view of turbocharger 30 which includes a turbine 40 disposed within a turbine housing 41, and a compressor 50 disposed within a compressor housing 51. The turbine 40 and the compressor 50 are mechanically coupled via a common rotatable shaft 33 which extends through a bearing housing 31. In operation, the turbine 40 receives, via a turbine exhaust intake 42, exhaust gas which is expelled from the engine 12 via the exhaust manifold 18. The intake 42 can communicate exhaust gas to the circumferential volute, or scroll, 45 which receives the exhaust gases and directs the same to the turbine 40. Exhaust gas thereafter is expelled from the turbine housing 41 via an exhaust conduit 43. The turbine 40 captures kinetic energy from the exhaust gases and spins the compressor 50 via the common shaft 33. Volumetric restrictions of the exhaust gas within the turbine housing 41 convert thermal energy into additional kinetic energy which is similarly captured by the turbine 40. For example, volute 45 can be particularly optimized to effect the conversion of thermal energy to kinetic energy. The rotation of the compressor 50 via the common shaft 33 draws in air through the compressor intake 52 which is compressed and delivered to the engine intake manifold 22 via conduit 53. Air can pass through an air filter 14 prior to entering the compressor intake 52. The turbocharger 30 increases the power output and/or volumetric efficiency of the engine 12 by increasing the oxygen per unit volume of air delivered to each of the cylinders 26. Compressed air can pass through an air cooler 20 before entering the intake manifold 22.

The common shaft 33 is supported by one or more bearings 32 disposed within bearing housing 31. The one or more bearings 32, and/or other rotating components of the turbocharger 30, are lubricated by fluid, such as oil, to ensure efficient operation the turbocharger and prevent wear or damage to components thereof. In a cold-start condition of a vehicle, the flow rate (e.g., as effected by an oil pump) of turbocharger lubricating fluid may be lower than desired, for example due to the temperature-reduced viscosity of the lubricating fluid. In some instances, one or more oil circuits can be fully drained in cold-start conditions, and therefore there be no oil flowing through turbocharger 30.

Figure 3:
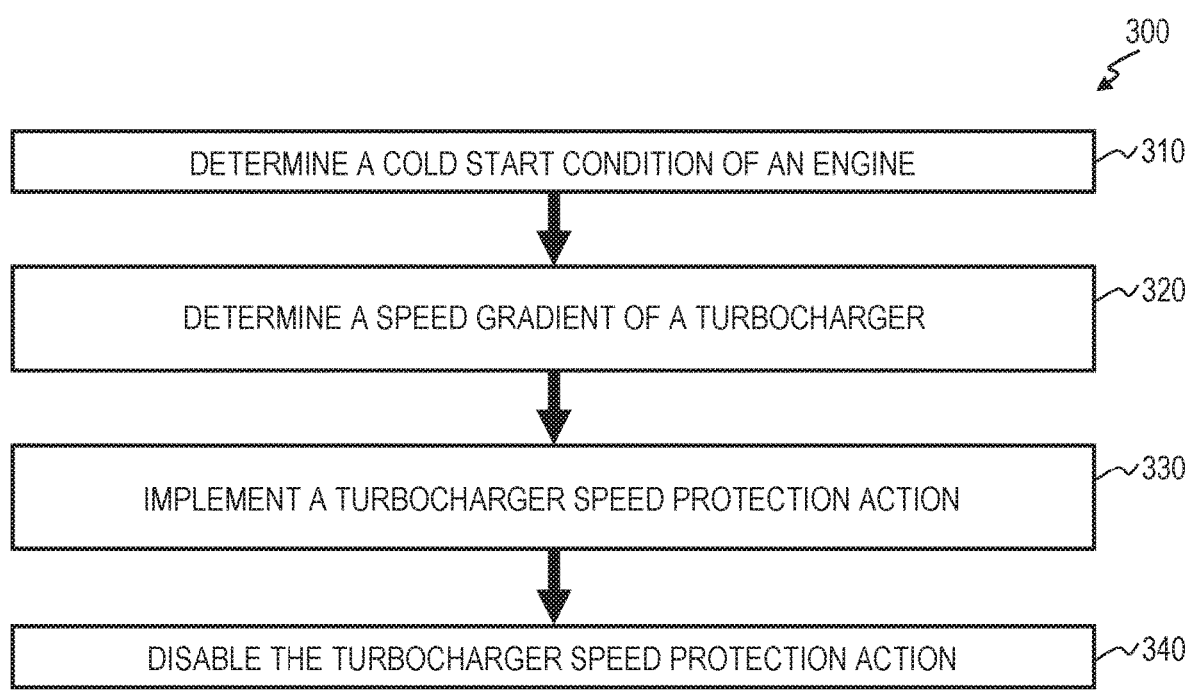
FIG. 3 illustrates a flowchart of a turbocharger protection method, according to one or more embodiments of the disclosure.

Accordingly, provided herein are turbocharger protection methods for controlling turbocharger-enhanced engine systems, such as system 11 of vehicle 10. The methods will be described in relation to vehicle 10 and system 11 for the sake of illustration, but are not intended to be limited thereby. FIG. 3 illustrates a method 300 for protecting a turbocharger 30 of an engine system 11 comprising determining 320 a speed gradient of the turbocharger, and implementing 330 a turbocharger speed protection action if the determined speed gradient is above a speed gradient threshold. Because method 300 is advantageously utilized in vehicle 10 cold-start conditions, method 300 can further comprise determining 310 a cold start condition of the engine 12 prior to determining 320 the speed gradient of the turbocharger. Additionally or alternatively, method 300 can further comprise, subsequent to implementing 330 the turbocharger speed protection action, disabling 340 the turbocharger speed protection action when a subsequently determined turbocharger speed gradient is below the speed gradient threshold. Controller 1 and vehicle 10 and system 11 are similarly configured to implement all disclosed methods. Accordingly, vehicle 10 and system 11 comprise a controller configured to determine 320 a speed gradient of the turbocharger, implement 330 a turbocharger speed protection action if the determined 320 speed gradient is above a speed gradient threshold, optionally determine 310 a cold start condition of the engine and implement 330 a turbocharger speed protection action if the determined 320 speed gradient is above a speed gradient threshold and a cold start condition is determined 310, and optionally disable the turbocharger speed protection action if, subsequent to implementing 330 turbocharger speed protection action, a subsequently determined turbocharger speed gradient is below the speed gradient threshold.

Determining 310 a cold start condition of the vehicle 10 can comprise one or more of determining an ambient temperature below an ambient temperature threshold, determining an engine oil temperature below an engine oil temperature threshold, and determining an engine coolant temperature below an engine coolant temperature threshold prior to determining the speed gradient of the turbocharger. Ambient temperature may be determined via ambient temperature sensor 72, for example. Engine oil temperature may be determined by engine oil temperature sensor 70, for example. Engine coolant temperature may be determined by engine coolant temperature sensor 68, for example.

Determining 320 a speed gradient of the turbocharger can comprise collecting a plurality of turbocharger speeds and determining a speed gradient for a certain period of time. Specifically, the turbocharger speed gradient is a speed vs. time domain defined by the ratio of the change in speed over time (dSpeed/dt). The speed of the turbocharger 30 can be the rotational speed of the turbine 40, the compressor, and/or the common shaft 33. The presence, absence, and/or amount of oil within the turbocharger 30 can be determined by the speed gradient thereof, in that a lack of oil in the bearings 32 will correspond to a higher speed gradient relative to a speed gradient observed when the bearings 32 are properly oiled. For example, an unoiled, or minimally oiled, turbocharger 30 may exhibit a speed gradient one order or magnitude higher than the speed gradient of a suitably oiled turbocharger 30. Accordingly, a turbocharger may be protected by limiting turbocharger 30 speed when a suitable amount of oil is not present therein. The speed gradient threshold may be predetermined, and stored in memory accessible by controller 1, for example. In some embodiments, the speed gradient threshold is selected from a lookup table indexed by one or more of ambient temperature and engine run time, fuel temperature, engine oil temperature, engine coolant temperature, and integrated engine torque measured from engine startup.

Implementing 330 a turbocharger speed protection action can comprise one or more of limiting engine torque, limiting engine speed, limiting vehicle speed, and limiting the fuel injection. For example, engine torque can be limited per a torque map, which corresponds to particular operating conditions (e.g., an ambient temperature-dependent torque map), for a period of time. The period of time can be a fixed amount of time, or can be determine by or based on the torque map. Protection actions generally are those which reduce, or prevent activity of the turbocharger 30. By implementing such protective actions, a turbocharger is prevented from seizing, undesirable friction between components is reduced, and other detrimental consequences of operating during an oil dearth are reduced or prevented. As the vehicle 10 and engine 12 operates, the temperature of appurtenant components and systems will increase, and oil will eventually communicate to the turbocharger 30 in suitable quantities. At such a time, the determined speed gradient of the turbocharger will evidence suitable oil presence within the turbocharger, and any previously implemented 330 protective actions can be disabled 340. Similarly, disabling 340 the turbocharger speed protection action can comprise returning to normal operating conditions, such as by utilizing a different torque map.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for protecting a turbocharger of an engine system wherein the turbocharger includes a turbine configured to receive exhaust gas from an engine, a compressor configured to communicate compressed air to the engine, a shaft mechanically linking the turbine and the compressor, and one or more bearings supporting the shaft, the method comprising:
    determining a speed gradient of the turbocharger;
    determining an unsuitable amount of oil in the one or more bearings based on the determined speed gradient; and
    implementing a turbocharger speed protection action if the determined speed gradient is above a speed gradient threshold.

2. The method of claim 1, wherein implementing a turbocharger speed protection action comprises limiting engine torque.

3. The method of claim 1, wherein implementing a turbocharger speed protection action comprises limiting engine speed.

4. The method of claim 1, wherein implementing a turbocharger speed protection action comprises limiting vehicle speed.

5. The method of claim 1, wherein implementing a turbocharger speed protection action comprises limiting fuel injection to the engine.

6. The method of claim 1, further comprising determining a cold start condition of the engine prior to determining the speed gradient of the turbocharger.

7. The method of claim 6, wherein determining a cold start condition of the engine comprises determining an ambient temperature below an ambient temperature threshold.

8. The method of claim 6, wherein determining a cold start condition of the engine comprises determining an engine oil temperature below an engine oil temperature threshold and/or determining an engine coolant temperature below an engine coolant temperature threshold prior to determining the speed gradient of the turbocharger.

9. The method of claim 1, wherein the speed gradient threshold is selected from a lookup table indexed by one or more of fuel temperature, engine oil temperature, engine coolant temperature, integrated engine torque measured from engine startup, and a combination of ambient temperature and engine run time.

10. The method of claim 1, further comprising subsequent to implementing the turbocharger speed protection action, disabling the turbocharger speed protection action when a subsequently determined turbocharger speed gradient is below the speed gradient threshold.

11. A turbocharger protection system comprising:
a turbocharger having a turbine configured to receive exhaust gas from an engine, a compressor configured to communicate compressed air to the engine, a shaft mechanically linking the turbine and the compressor, and one or more bearings supporting the shaft; and
a controller configured to:
determine a speed gradient of the turbocharger;
determine an unsuitable amount of oil in the one or more bearings based on the determined speed gradient; and
implement a turbocharger speed protection action if the determined speed gradient is above a speed gradient threshold.

12. The turbocharger protection system of claim 11, wherein implementing a turbocharger speed protection action comprises limiting engine torque.

13. The turbocharger protection system of claim 11, wherein implementing a turbocharger speed protection action comprises limiting engine speed.

14. The turbocharger protection system of claim 11, wherein implementing a turbocharger speed protection action comprises limiting vehicle speed.

15. The turbocharger protection system of claim 11, wherein implementing a turbocharger speed protection action comprises limiting fuel injection to the engine.

16. The turbocharger protection system of claim 11, wherein the controller is further configured to determine a cold start condition of the engine, and implement a the turbocharger speed protection action if the determined speed gradient is above a the speed gradient threshold.

17. The turbocharger protection system of claim 16, wherein the controller is configured to determine the cold start condition of the engine if an ambient temperature is below an ambient temperature threshold.

18. The turbocharger protection system of claim 16, wherein the controller is configured to determine the cold start condition of the engine if an engine oil temperature is below an engine oil temperature threshold.

19. The turbocharger protection system of claim 11, wherein the controller is configured to select the speed gradient threshold from a lookup table indexed by one or more of fuel temperature, engine oil temperature, engine coolant temperature, integrated engine torque measured from engine startup, and a combination of ambient temperature and engine run time.

20. The turbocharger protection system of claim 11, wherein the controller is configured to disable the turbocharger speed protection action if, subsequent to implementing turbocharger speed protection action, a subsequently determined turbocharger speed gradient is below the speed gradient threshold.

* * * * *